United States Patent [19]

Baumann

[11] 4,345,361
[45] Aug. 24, 1982

[54] TOOL FOR JOINING PIPES

[75] Inventor: Gerhard Baumann, Schaffhausen, Switzerland

[73] Assignee: Georg Fischer Aktiengesellschaft, Switzerland

[21] Appl. No.: 168,006

[22] Filed: Jul. 14, 1980

[30] Foreign Application Priority Data

Jul. 18, 1979 [CH] Switzerland ................ 6669/79

[51] Int. Cl.³ ............................................. F16L 35/00
[52] U.S. Cl. .......................................... 29/237; 29/252
[58] Field of Search .................... 29/237, 252, 283.5, 29/432, 525; 285/382, 382.1–382.7, 39

[56] References Cited

U.S. PATENT DOCUMENTS

| 3,148,902 | 9/1964 | Gardner | 285/39 |
| 3,299,496 | 1/1967 | Christensen | 29/237 |
| 3,474,519 | 10/1969 | Hallesy | 29/432 |
| 4,082,321 | 4/1978 | Nakajima et al. | 285/39 |
| 4,133,557 | 1/1979 | Ahlstone | 29/237 |
| 4,257,155 | 3/1981 | Hunter | 285/382.2 |

Primary Examiner—Robert C. Watson
Attorney, Agent, or Firm—Roylance, Abrams, Berdo & Farley

[57] ABSTRACT

A tool for forming a pipe joint of the type wherein a ring with a frusto-conical inner surface is forced over the belled one of two telescopically assembled pipes includes a jaw assembly having two pairs of jaws which are axially movable toward each other, one pair to engage the bell shoulder and the other to engage and push the ring. A pressure clamp has two forks shaped to engage the ends of the jaw assembly and a piston and cylinder assembly to linearly move one fork toward the other, thereby moving the jaws and forming the joint. The size of the jaw assembly can be selected according to pipe diameter.

12 Claims, 9 Drawing Figures

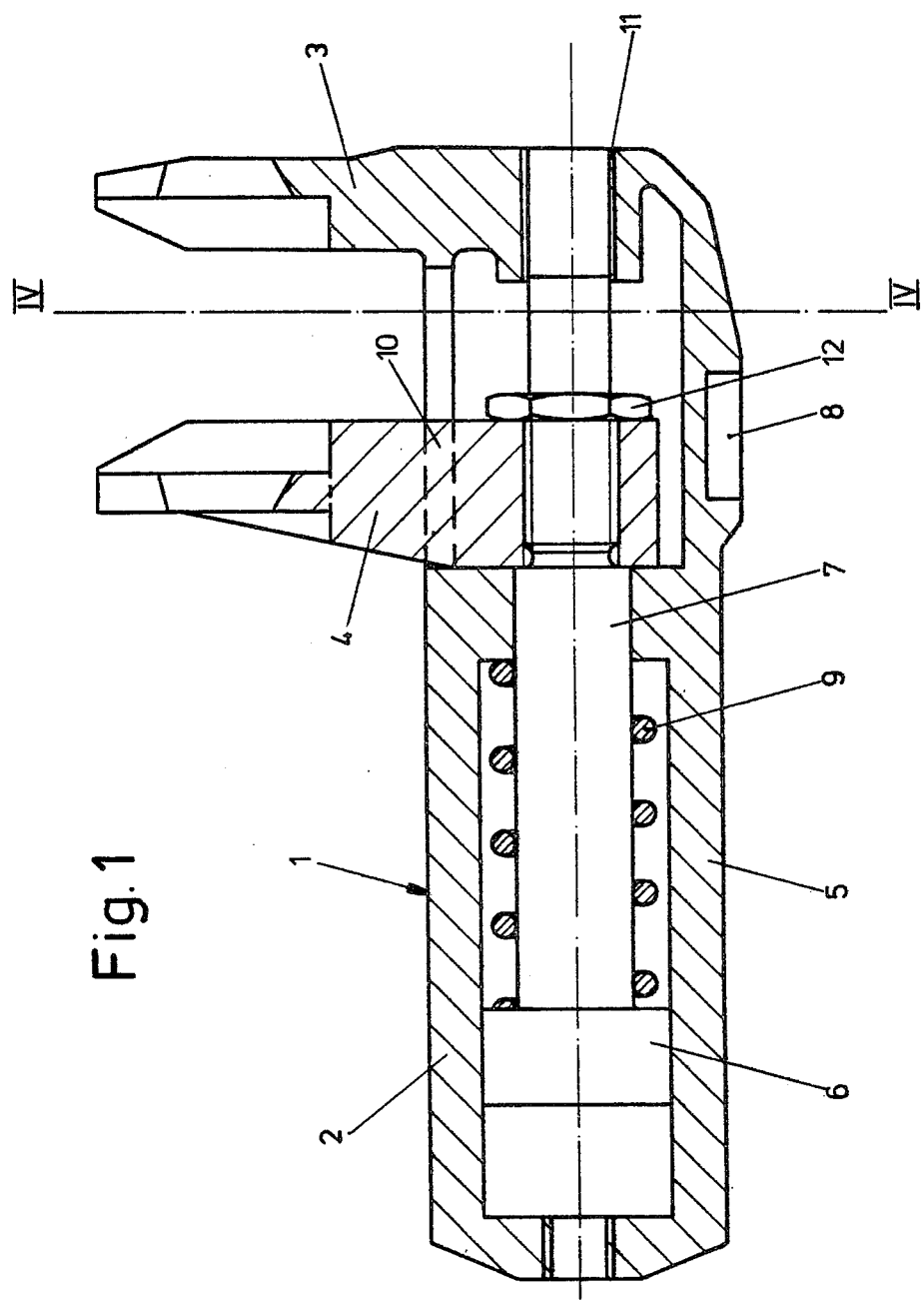

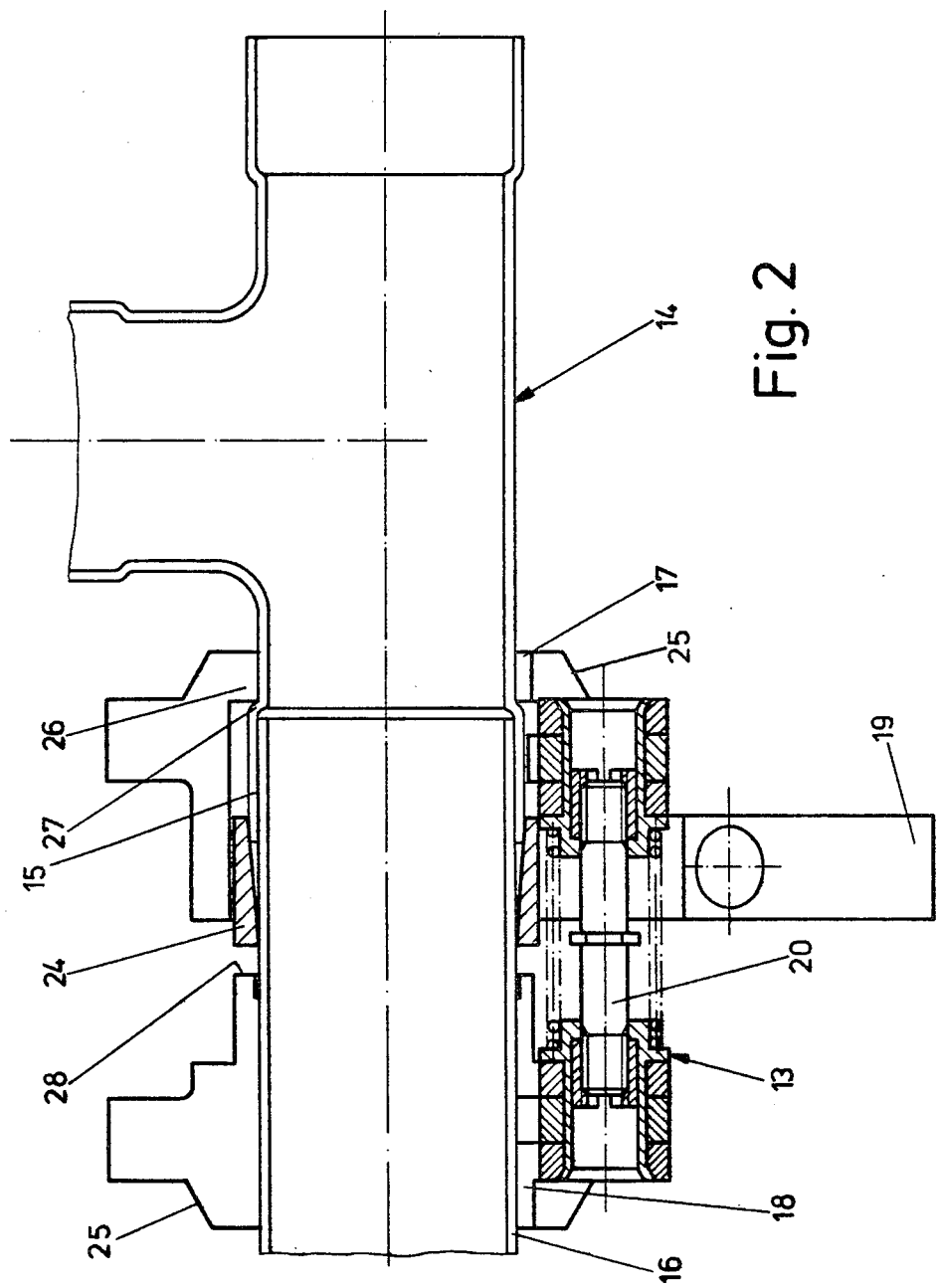

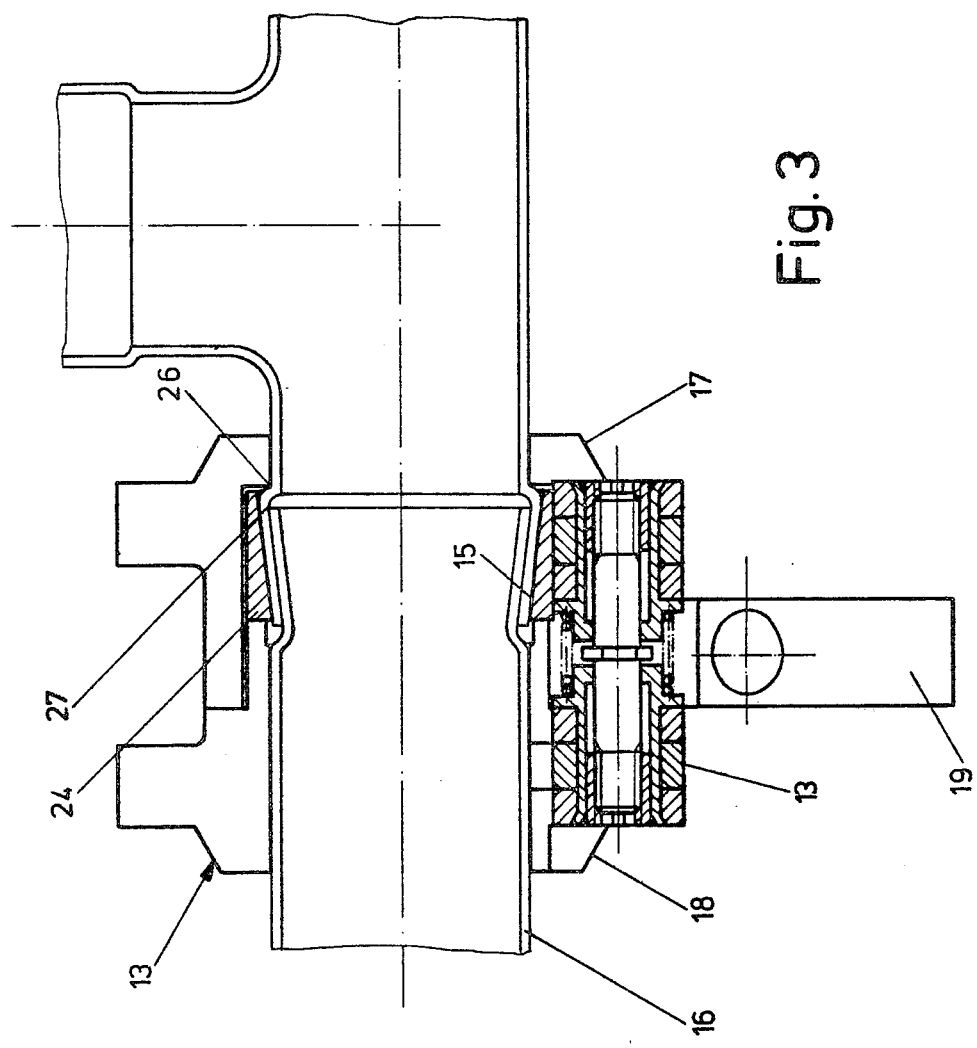

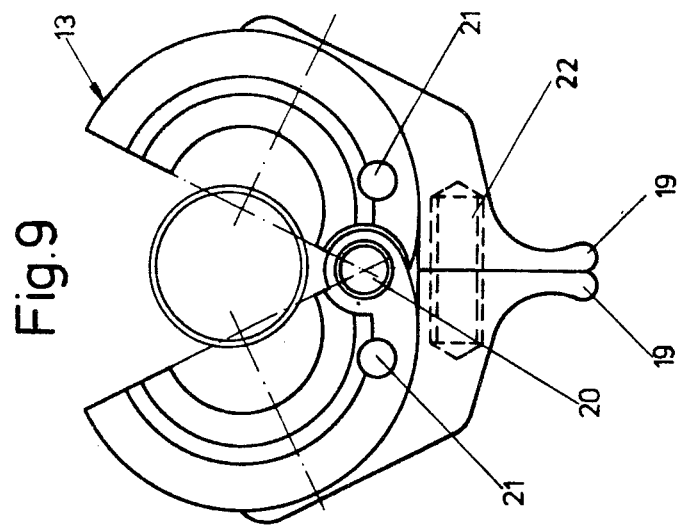
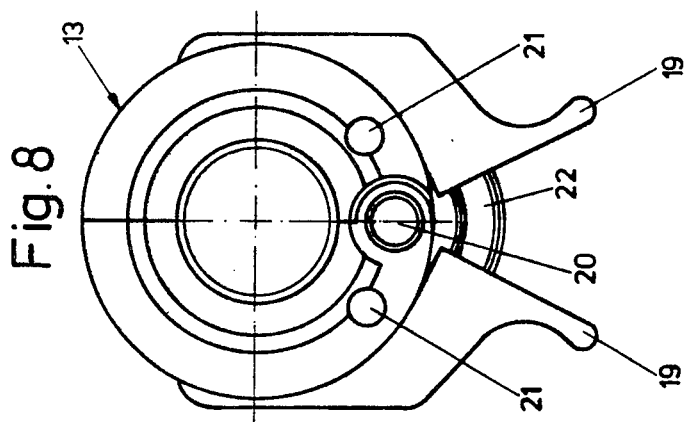
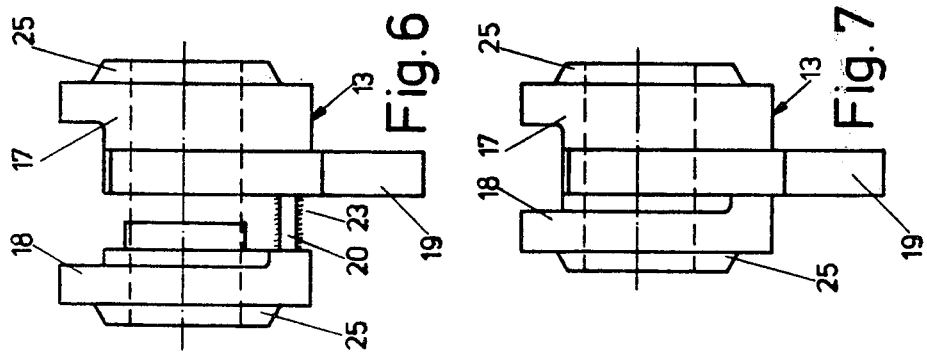

TOOL FOR JOINING PIPES

This invention relates to an apparatus for joining pipes with a pipe joint of the type wherein a ring having frusto-conical inner surface is forced over telescopically assembled pipe ends.

BACKGROUND OF THE INVENTION

In a known technique which is used to join the ends of pipes, and particularly steel pipes having thin walls, one of the pipe ends is enlarged to form a bell or socket and the end of the adjoining pipe is telescopically inserted into that socket. A ring having a frusto-conical inner surface is then pressed axially along the pipe over the outer surface of the bell, the conical surface pressing the outer, belled, pipe end inwardly against the inner pipe, deforming both pipe ends and creating a tight connection between the two pipes. This technique for connecting pipes has been known for a number of years and results in a tight and long lasting pipe joint. Pipe joints of this type are described, for example, in French Pat. No. 1,140,797.

The formation of such joints has posed some problems due to the high pressures and forces required for such connections. Since the necessary force for steel pipes with an outer diameter of from 10 to 35 millimeters lies between 1 and 3 tons, the use of hand tools for forcing the ring over the bell is practically impossible.

In U.S. Pat. No. 3,474,519 an hydraulic tool for moving two rings over a pipe bell is shown, referring particularly to FIG. 9. The tool shown therein is fork-shaped and is provided with two prongs, one of which is supported on the other one and is swingable by means of a hydraulic drive unit toward and away from the other one. Both tips of the prongs are provided with partially ringshaped elements to be applied to two end surfaces of the rings.

This existing tool has the disadvantage, among others, that it is designed for simultaneous mounting of two rings, and, therefore, cannot be employed for mounting one ring only. Furthermore, the tips of the prongs describe an arc of a circle during the pressing action with the result that the pressure on the end surfaces of the rings varies. Therefore, it is possible for the rings to be pressed at a sloping angle relative to the pipe, axis, and it is also possible for the pipe to be pressed inwardly irregularly along its circumference.

A further disadvantage is the fact that all of the elements of the tool are formed as a unitary assembly so that the tool can be used for one certain pipe diameter only. Thus, for each different pipe diameter, it is necessary to use a different tool. Also, application of the tool to pipes having T-shaped branching elements is not possible. In the case of wear or damage of the fork elements, it is necessary to replace the entire tool. As will be recognized, when pipes are being laid at a construction site, separate tools for the different pipe diameters must be brought to the site.

Due to the design of the tool, e.g., the long, fork-shaped elements and the forces acting thereon, and because of the fact that the elements cannot be separated from the rest of the tool, the assembly is rather heavy and bulky.

BRIEF DESCRIPTION OF THE INVENTION

Accordingly, the principal object of the invention is to provide a tool for joining pipes which avoids the disadvantages of the prior art design.

Furthermore, it is the goal of the present invention to provide a tool which has the advantages of being as light as possible, applicable to a large range of pipe diameters, rapidly adjustable to different pipe diameters, and suitable for use as a construction site.

Briefly described, the invention includes a tool for forming a pipe joint of the type wherein end portions of pipes to be joined are telescopically assembled, one of the pipes having a radially enlarged end portion to receive the end of the other pipe, and a ring having a frusto-conical interior surface is forced over the outer pipe end to deform and join the assembled ends, the tool comprising a clamping jaw assembly including two pairs of jaws for engaging the ring and the pipes adjacent the assembled ends, each jaw having an arcuate recess, means for coupling the jaws of each pair together for pivotal movement about an axis parallel with the axes of the arcuate recesses, the pivot axes of said pairs being aligned, means for biasing said pairs of jaws axially away from each other, and means for urging the jaws of each pair toward each other; and pressure clamp means engagable with said jaw assembly for urging said pairs of jaws linearly toward each other for forcing said ring onto the assembled ends.

The invention disclosed herein, as will be seen from the following description, provides numerous advantages, including the fact that the same tool can be used for different pipe diameters by changing only the elements acting on the ring. As a consequence, only one tool and a selection of jaw assemblies is needed at a construction site for different pipe sizes. This results in savings in initial investment, transportation and inventory. Due to the easy separation of the jaw assemblies from the tool, the components are lighter and easier to handle. Also, the tool can be placed over the shoulder of a pipe bell and the end surface of a ring so that the joint does not require two rings. Thus, the connection is simpler to make, is shorter and is more stable. The separation between the tool end and the jaw assembly facilitates the manufacturing of the jaw assembly elements which can thus be fitted precisely on the shoulder of the pipe bell and the end surface of the ring. This exact positioning of the tool against pipes telescopically assembled increases the precision of the connection. The tool element involves linear motion which permits increased pressure, and the tool design guarantees precise positioning against the shoulder of the pipe bell as well as against the ring so that no large shoulder is required.

Additionally, the tool is not only well suited for work in assembly situations in a shop but is also well suited to use at a construction site. By shaping the jaw assemblies in such a way that they are of different sizes, one being adapted to apply pressure against the ring and the other being of a different size to accomodate the bell, incorrect positioning of the jaw assembly will become readily apparent and prevent incorrect usage thereof. During the pressure cycle there is substantially no deformation of the bell except for the radial pressure thereof against the inner pipe. Finally, the tool disclosed herein is applicable to pipes of all metals commonly used for pipe formation.

In order that the manner in which the foregoing and other objects are attained in accordance with the invention can be understood in detail, particularly advantageous embodiments thereof will be described with reference to the accompaning drawings, which form a part of this specification and wherein:

FIG. 1 is a longitudinal section through a first embodiment of the pressure applying portion of a tool in accordance with the present invention;

FIG. 2 is a side elevation, in longitudinal section, through a jaw assembly positioned on assembled pipes to be joined;

FIG. 3 is a view similar to FIG. 2 after the joining operation;

FIG. 6 is a simplified side elevation of a jaw assembly in a position to be applied to pipes to be joined;

FIG. 7 is a view similar to FIG. 6 with a jaw assembly in a compressed condition;

FIG. 8 is an end view of a jaw assembly in its closed position; and

FIG. 9 is a view similar to FIG. 8 but with the jaws in the open position.

Figure 5:
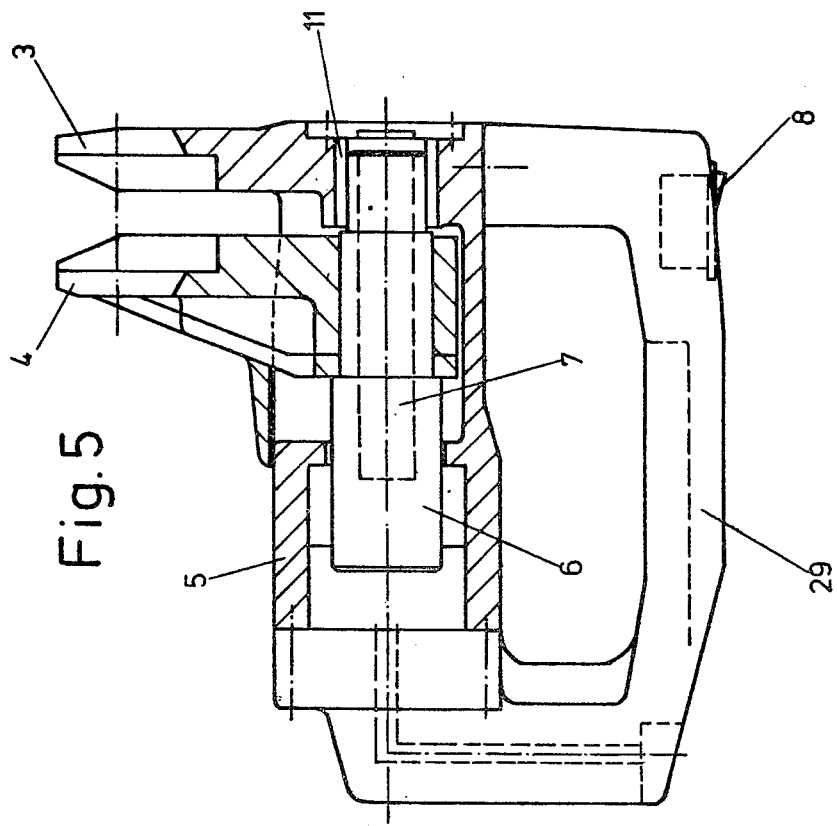
FIG. 5 is a side elevation, in partial section of a further embodiment of a pressure clamp.
Figure 4:
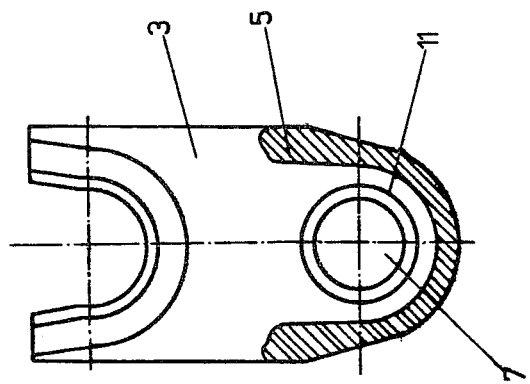
FIG. 4 is a transverse section along line IV—IV of FIG. 1.

FIG. 1 shows a longitudinal sectional view of a pressure clamp or tong 1 with a piston and cylinder unit 2 and two forks 3 and 4. The first fork 3 is an intergrally formed or fixedly attached portion of the cylinder housing 5 and the second fork 4 is attached to and movable with the rod 7 of the piston 6. Piston 6 would normally be driven to the right, as shown in FIG. 1, by hydraulic fluid under pressure connected to the opening at the left-hand end of cylinder housing 5, the conduit, hydraulic source and pump being conventional and, therefore, not illustrated.

When the pressure clamp apparatus 1 is operated, the second fork 4 moves toward fork 3. This actuation can be controlled by a switch located at 8 which is coupled to control the application of fluid under pressure or, alternatively, the apparatus can be actuated by a separate switch such as a floor switch. Conveniently, the outer surface of cylinder 5 can be roughened to serve as a handle and it can also be provided with a plastic layer.

It is desirable that fluid pressure be removed from the piston and cylinder assembly when fork 4 has completed the extent of its travel toward fork 3 so that no pressure continues to act on the forks. This function can be accomplished by means of a pressure relief valve or by a pressure or limit switch, not shown. Thereafter, piston 6 is returned to the starting position shown in FIG. 1 by means of a coil compression spring 9 which surrounds the piston rod so that the piston is again ready for further movement.

During the movement, the second fork 4 is guided in two ways. In order to prevent rotational movement of the fork, an elongated opening 10 extending in a direction parallel with the longitudinal axis of the apparatus is provided in the housing forming an extension of cylinder 5 through which the fork extends, the sides of the fork being guided by the sides of the elongated opening. Additionally, an extension of piston rod 7 extends axially through a bushing 11 in an opening at the end of the structure adjacent fork 3 to prevent lateral movement or bending of the fork and piston rod. Fork 4 is non-rotatably mounted on the piston rod and is attached attached thereto by a nut 12 which threadedly engages a threaded portion of the piston rod.

A clamping jaw assembly 13 for accomplishing the application of pressure which forms the pipe joint is illustrated in FIGS. 2 and 3 which shows a joint or connection between a pipe end 15 of a T-shaped pipe element 14 and the end of a second pipe 16. It will be observed that the end 15 of pipe element 14 has been enlarged or belled by conventional apparatus so that the inner diameter thereof exceeds the outer diameter of the end of pipe 16, the bell or socket being capable of telescopically receiving pipe 16. The bell thus formed has a shoulder 27 which limits the insertion of pipe 16 and provides a shoulder for engaging one of the jaws. The jaw assembly 13, further illustrated in FIGS. 5-9, includes two pairs 17 and 18 of jaws defining an inner circular opening, each pair of jaws being pivotable by actuation of two levers 19 about a pivot pin 20. Levers 19 are mounted on the jaws of the first pair of jaws 17 and the pivoting force is transferred to the second pair of jaws 18 by means of two axially extending lugs 21 (FIGS. 8 and 9). Both pairs of jaws are biased toward the closed position by means of a compression coil spring 22 which extends into and between levers 19. In the fully opened position (FIG. 9) the pairs of jaws 17, 18, can be radially inserted over the pipe end 15 with the pipe end 16 inserted therein. In the closed position shown in FIG. 8, the pairs of jaws 17 and 18 define a circular or cylindrical volume and lie against the outer circumference of the pipe end 15 and pipe 16 as seen in FIGS. 2 and 3.

The pin 20 and lugs 21 are so designed that they allow movement between the two positions shown in FIGS. 6 and 7. A compression coil spring 23 surrounds pivot pin 20 and urges the pairs of jaws 17 and 18 away from each other.

When forming the pipe joint, jaw assembly 13 is opened by moving levers 19 toward each other and is put over the pipe ends with end 16 inserted into the bell 15 of the T element, and with the largest inner diameter end of a ring 24, having a frusto-conical inner surface, pushed over the distal end of bell 15. The jaws of assembly 13 are then closed. The pressure clamp assembly is then placed over assembly 13 so that the ends 25 of the assembly are engaged by forks 3 and 4. It will be observed that ends 25 are in the shape of frusto-conical protruding surfaces which correspond to the surfaces of recesses in forks 3 and 4. With this arrangement, an exact engagement and centering between the ends of assembly 13 and forks 3 and 4 is guaranteed. Jaws 17 and 18 are, therefore, kept in closed positions during the movement of ring 24. The surfaces of forks 3 and 4 and the surfaces at the ends 25 of the jaw assembly can be precisely machined or otherwise formed to guarantee a very close tolerance fit therebetween and to, thus, guarantee a precisely formed joint between bell 15 and pipe end 16.

The arrangement of the pairs of jaws 17 and 18 around the pipe joint to be formed is shown in FIG. 2. It will be seen that the diameter of the bell 15 of the T-element 14 is formed into a bell or socket having a shoulder 27 engaged by an inner edge 26 of jaws 17, and that an axially facing annular surface 28 of the other pair of jaws 18 is substantially aligned with the thicker end of ring 24. When the forks 3, 4 are caused to move together by the application of hydraulic pressure to the piston and cylinder assembly, jaws 18 are moved toward jaws 17, forcing ring 24 over the exterior of bell 15, forming a finished joint between the pipe ends 15, 16 as shown in FIG. 3. As illustrated therein, the frusto-conical inner surface of the ring 24 modifies the shape of bell 15 so that it is forced inwardly, causing the end of pipe 16 to assume a corresponding shape. In this way, a wedge-type joint results between the components 15, 16 and 24. The forces created in this way keep the joint together.

FIG. 5 shows a modified embodiment of a pressure clamp structure which is, in principal, similar to FIG. 1 but which includes a closed, D-shaped or ring-shaped handle 29 which is provided with a built-in switch 8 and preferably is formed of cast aluminum.

In order to reduce weight, the various parts of the tool are preferably made of light and strong materials. Thus, jaws 17, 18 are made, for example, of tool steel, while the levers 19 can be of aluminum. Piston housing 5 and forks 3 and 4 can be of cast or forged steel.

The embodiments described the advantage that the same tool can be used for different pipe diameters. It is further advantageous that the assembly 13 can easily be separated from the pressure clamp so that the weight to be held in using the tool is relatively small.

In order to secure safe and accurate engagement of the element against the shoulder of the belled portion of the pipe and the end surface of the ring, the two ends of the jaw assembly are differently shaped. For that reason, if the jaw assembly is placed over the pipe joint to be formed in the incorrect position, the element will not close entirely, and the error will be quickly detected. The bell portion needs only a small shoulder for the positioning of the jaw assembly. The radial direction of the levers relative to the pipe axis during operation of the tool is unimportant, which means that the jaw assembly can be engaged by the pressure clamp from various angles, permitting access from various sides depending upon the configuration of the pipe and surrounding structures, as convenient.

The surfaces of the pipe and of the bushing can, for example after cleaning, be provided with a layer of any kind to increase the stability of the joint. However, no such layer or coating is required for a tight joint unless the pipe surfaces are initially quite rough.

The ring normally consists of high grade steel which does not promote corrosion in a joint between steel or copper pipes.

Although thick pipes of high-grade steel can be welded, such welding is not possible with thinner pipes, for which the tool described is particularly intended.

As a driving source for the tool, a hydraulic unit having a maximum pressure of, for example, 200 bar is preferred. However, pneumatic or electric drives can also be used as well as hydraulic systems having lower pressures.

The contact area between the jaw assemblies and the forks extends circumferentially over at least 180° and preferably more.

While certain advantageous embodiments have been chosen to illustrate the invention it will be understood by those skilled in the art that various changes and modifications can be made therein without departing from the scope of the invention as defined in the appended claims.

What is claimed is:

1. A system for forming a pipe joint of the type wherein end portions of pipes to be joined are telescopically assembled, one of the pipes having a radially enlarged end portion to receive the end of the other pipe, comprising
    a ring having a frusto-conical interior surface;
    a clamping jaw assembly including
        first and second pairs of jaws with means for engaging said ring and the pipes adjacent the assembled ends, each jaw having an arcuate recess,
        means for coupling the jaws of each pair together for pivotable movement about an axis parallel with the axes of the arcuate recesses, the pivot axes of said pairs being aligned,
        means for biasing said first pair of jaws axially away from said second pair of jaws, and
        means for urging the jaws of each pair toward each other; and
    pressure clamp means for engaging said jaw assembly and for pressing said pairs of jaws toward each other for forcing said ring onto the assembled ends;
    whereby said ring is forced over the outer pipe end to deform and join the assembled pipe ends by said clamping jaw assembly and said pressure clamp means.

2. A system according to claim 1 wherein each outer end of said clamping jaw assembly includes a frusto conical axial protrusion having predetermined dimensions independent of the diameter of the pipes to be joined,
    and wherein said pressure clamp means comprises
        first and second fork members for engaging said pairs of jaws,
        each of said fork members having a frusto-conical recess dimensioned to receive and retain one of said protrusions.

3. A system according to claim 1 or 2 wherein said clamping jaw assembly includes
    lug means for coupling said first pair of jaws to said second pair of jaws for concurrent pivotal movement; and
    lever means mounted on one pair of said jaws for manually pivoting said jaws apart in opposition to said means for urging the jaws toward each other whereby said jaw pairs can be pivoted apart for placement over the pipe ends to be joined.

4. A system according to claim 1 or 2 wherein said first pair of jaws includes an annular shoulder for engaging the shoulder of the enlargement of the outer one of said pipes, and
    said second pair of jaws includes means defining an annular surface for abutting an end surface of said ring.

5. A system according to claim 2 wherein said frusto-conical recess in each jaw extends over an arc of at least 180°.

6. A system according to claim 2 or 5 wherein said pressure clamp means further includes hydraulic drive means for moving said jaws toward each other.

7. A system according to claim 1 or 2 wherein said ring is formed of high-grade steel.

8. A system according to claim 1 wherein said means for urging comprises a spring.

9. A system according to claim 1 wherein said means for biasing comprises a spring extending axially between said first and second pairs of jaws.

10. A system according to claim 4 wherein said second pair of jaws have generally semi-cylindrical projections which extend toward and are receivable within said first pair of jaws and which terminate at said annular surface.

11. A system according to claim 1 wherein said jaw assembly is detachably coupled to said pressure clamp means.

12. A system according to claim 1, wherein each said arcuate recess is semi-cylindrical.

* * * * *